March 19, 1963     E. S. DOMBROWIK     3,081,709

COFFEE MAKER

Filed April 20, 1959

INVENTOR.
EUGENE S. DOMBROWIK

BY Lindsey and Pruitzman
ATTORNEYS

United States Patent Office 3,081,709
Patented Mar. 19, 1963

3,081,709
COFFEE MAKER
Eugene S. Dombrowik, New Britain, Conn., assignor to Landers, Frary and Clark, New Britain, Conn., a corporation of Connecticut
Filed Apr. 20, 1959, Ser. No. 807,432
3 Claims. (Cl. 103—231.5)

This invention relates generally to coffee makers of the electrically heated percolator type and more particularly to an improved pump assembly therefor.

It is an object of the present invention to provide an electric percolator type coffee maker having improved coffee making action and including an improved electric percolator pump assembly which provides more efficient water pumping action with consequent reduction in the quantity of steam that is pumped.

It is a further object of this invention to provide an improved electric percolator pump assembly that is economical to manufacture, easy to clean, and durable and efficient in operation.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
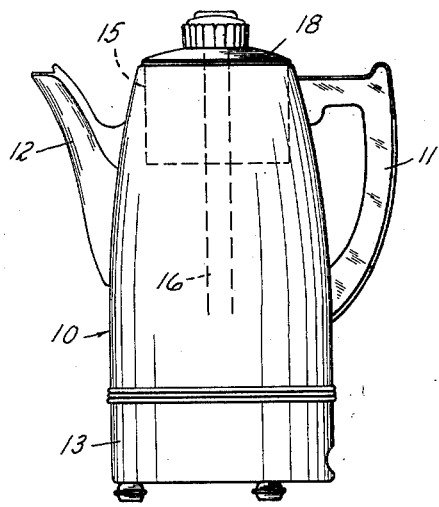
FIG. 1 is a side elevational view of one form of an electric percolator embodying the present invention.

The illustrated embodiment of my invention generally comprises an electric type of percolator with a vessel 10 having a handle 11, a pouring spout 12 and a false bottom 13 which houses and protects the heating unit and electrical circuits therefor. A conventional basket 15 is supported on a fountain tube 16 (see dotted lines, FIG. 1) and the vessel 10 is closed by a conventional cover 18.

The vessel 10 is of sheet metal construction and is formed with a unitary bottom wall 20 having a central aperture in which is disposed a sump or well 22 extending downwardly from vessel bottom 20 into the region of the false bottom. Sump 22 is generally cup shaped with a substantially cylindrical sidewall 24 whose outer surface has electrical heating element 25 coiled tightly thereabout. Heating element 25 is brazed or otherwise affixed to sidewall 24 so as to be in good heat conducting relationship therewith. Upper end or rim 26 of sump 22 extends through the aperture in vessel bottom wall 20 and is provided with a threaded exterior surface. The sidewall portion adjacent rim 26 is provided with a peripheral radial shoulder 27 on which is placed the seal or packing 28 so that advancing nut 30 on the threaded sidewall adjacent rim 26 will compress packing 28 thereby closing the aperture and sealing the bottom 20 of vessel 10. It is noted at this point that the sump 22 is provided with an outwardly flared mouth 33 which cooperates with the percolator pump as hereinafter described in more detail.

Fountain tube 16 is provided with a pump 34 at its lower end, which pump engages and is supported by sump 22, thereby to position coffee basket 15 in the approximate position shown in dotted lines of FIG. 1. Pump 34 generally comprises an upper housing 36, a base 38 and a disc valve 39. Upper housing 36 is secured to fountain tube 16 by the frictional engagement of the lower end of fountain tube 16 with neck 40 and flares outwardly from neck 40 in the general shape of a bell. The generally cylindrical sidewall portion 41 of housing 36 defines the limits of movement of disc 39 during pump action as hereinafter described. Base 38 is provided with an annular radially extending rim 43 which is clampingly engaged by housing rim 44 and has a stem 45 extending downwardly from rim 43 into sump 22. Disc 39 is provided with a central aperture 60 and normally overlies rim 43 to close a plurality of apertures 61 formed in rim 43.

To effect sealing contact between pump 34 and sump 22, stem 45 is provided with a first portion 49 of diameter larger than the inside diameter of the cylindrical sidewall 24 and a second or lower portion 50 of diameter less than the inside diameter of sidewall 24, the juncture point 46 of said portions defining a ledge in sealing engagement with the outwardly flared mouth 26 of sump 22. It is to be understood, of course, that other structures which provide peripheral contact between stem 45 and flared mouth 26 so as to provide sealing engagement therebetween can be utilized.

Figure 3:
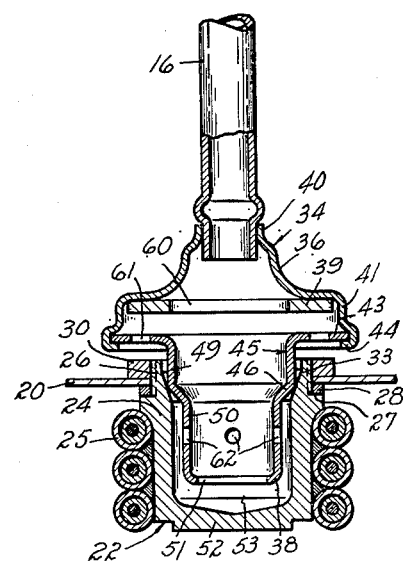
FIG. 3 is a partial cross section view of the heating and pump elements.
Figure 2:
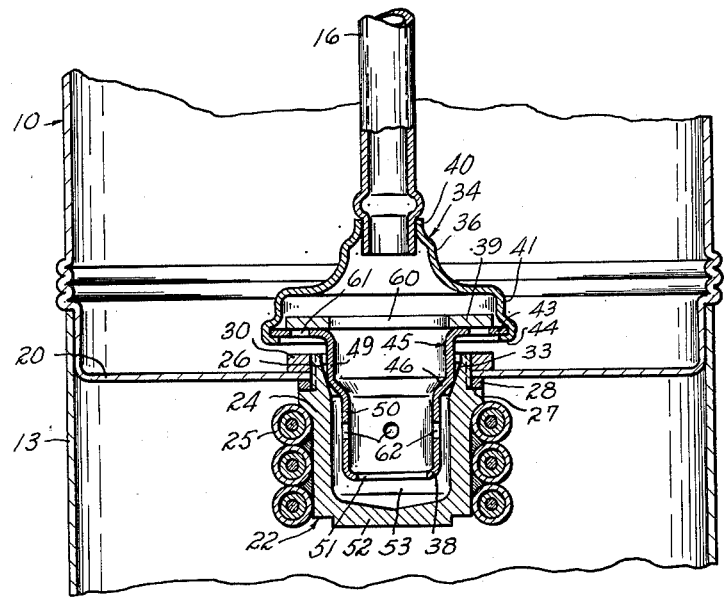
FIG. 2 is an enlarged fragmentary view in cross section of the heating and pump elements employed in the improved percolator.

As most clearly seen in FIGS. 2 and 3, lower portion 50 of stem 45 is adjacent but spaced from sidewall 24 of sump 22 because of its slightly smaller diameter. In addition, stem portion 50 is provided with an open end 51 which is adjacent but spaced from bottom wall 52 of sump 22. Thus, the inside walls of sump 22 and lower portion 50 of stem 45 cooperate to define chamber 53 which communicates through open end 51 with fountain tube 16.

In operation of the aforedescribed percolator assembly, vessel 10 is initially supplied with the desired amount of water, a portion of which enters pump 34 by unseating disc 39 (see FIG. 3) and passing through the aperture 60 until the column of water stands within fountain tube 16 to the level of the water in vessel 10. As pump 34 and fountain tube 16 fill with water, the water also fills the chamber 53. The concentration of heat from electrical heating element 25 around the sidewall 24 of sump 22 vaporizes the relatively small quantity of water contained in the aforementioned annular chamber to cause a surge of steam upwardly in fountain tube 16. At least a part of the column of water in the fountain tube will thus surge upwardly with the steam to spray over the contents of the basket. The liquid pressure within the fountain tube and pump is reduced by the removal of the quantity of water sprayed over the basket 15 and additional water from vessel 10 enters the pump in the previously described manner and the heating and percolating process is repeated.

The water ejected at the top of the fountain tube and sprayed over the coffee grounds within the basket 15, trickles through these grounds into the vessel 10 so as to form the desired brew therein. The frequency of the heating and percolating action increases as the temperature of the water or brew admitted to the pump increases and the percolating action will continue until the brew reaches the desired strength and temperature.

As seen from the aforementioned description of the improved pump assembly and its operation, it is apparent that the volume of water exposed to steam generating temperatures is limited by the dimensions of chamber 53 defined by sidewall 24 of sump 22 and lower portion 50 of stem 45. The length of chamber 53 is such as to expose a relatively large area of water to the heating action, thus insuring rapid conversion of the water in the chamber 53 into steam so as to provide rapid pump action. The steam so produced must travel primarily through the open end 51 of stem 45 thus forming the steam bubble below the major volume of water within the pump housing and fountain tube so that only water is forced upward. The small amount of steam that travels upwardly in the fountain tube to expel water into coffee basket 15 normally condenses within the fountain tube so as to effectively eliminate steam pumping which greatly reduces the efficiency of the percolator water pump.

In the event that the pumping action produced by the aforedescribed structure is too vigorous, it has been found desirable, in certain applications, to provide a plurality of spaced apertures 62 in the lower portion 50 of pump base 38. These apertures admit a controlled amount of steam directly into the pump housing without necessitating the travel of the steam bubble into the open end of the stem thereby reducing the vigorous nature of the pump action.

It is apparent from the aforegoing description that water entering pump 34 from vessel 10 has stem 45 as a barrier or wall between it and the heated wall of sump 22. Thus, the water in chamber 53 is much hotter than the water in pump 34 thereby further minimizing the formation of steam within pump 34 that would be pumped along with the water by the main steam bubble. Also, the amount of water inside the pump 34 and even the amount of water within the stem 45 is much greater than the amount of water in chamber 53 so as to further minimize the pumping of steam.

It is therefore seen that the quantity of water exposed to the heating action by my improved pump is controlled to provide improved pumping action by retarding formation of steam within the pump housing. Thus, the efficiency of the pump assembly as a water pump is greatly improved by reducing the pumping of steam. My unique construction not only improves the speed of response of the percolator pump but also improves its efficiency so as to more quickly provide a more appetizing brew.

As will be apparent to persons skilled in the art, various modifications and adaptations of the structure above described will become readily apparent without departure from the spirit and scope of the invention, the scope of which is defined in the appended claims.

I claim:

1. In a coffee maker of the percolator type, a vessel having an apertured bottom wall, a sump disposed in the aperture in said bottom wall and extending downwardly therefrom, said sump having a generally cylindrical sidewall terminating in an outwardly flared mouth adjacent said bottom wall, electrical heating means disposed about the outside wall of said sump, a fountain tube and a pump on the lower end of said fountain tube and communicating therewith, said pump comprising an enlarged upper housing affixed to said fountain tube, a hollow base member, said base member having an annular rim affixed to said upper housing and an open-ended stem extending downwardly from said rim into said sump, the bottom of said stem being adjacent but spaced from the bottom of said sump, said stem having upper and lower portions, said upper portion having a greater diameter than the lower portion thereby to define a ledge at the juncture of said portions, said ledge being in sealing contact with the outwardly flared mouth of said sump, the sidewall of said second portion of said stem being spaced but adjacent the inside wall of said sump to define an annular chamber therebetween, a plurality of spaced apertures in said rim, and a movable centrally apertured disc overlying said rim and closing said apertures.

2. In a coffee maker of the percolator type, a vessel having an apertured bottom wall, a sump disposed in the aperture of said bottom wall and extending downwardly therefrom, said sump having a generally cylindrical sidewall, electrical heating means disposed about the outside wall of said sump, a fountain tube and a pump on the lower end of said fountain tube and communicating therewith, said pump comprising an enlarged upper housing affixed to said fountain tube, a hollow base member, said base member having an annular rim affixed to said upper housing and an open-ended stem extending downwardly from said rim into said sump, the bottom of said stem being adjacent but spaced from the bottom of said sump, said stem having means thereon in sealing engagement with the upper rim of said sump, the sidewall of said stem below the rim of said sump being adjacent but spaced from the sidewall of said sump to define an annular chamber therebetween, said stem side wall below the sump rim having a plurality of circumferentially spaced apertures therein facing the sidewall of said sump, a plurality of spaced apertures in said rim of said base member, and a movable centrally apertured disc overlying said rim and closing the apertures in said rim.

3. The coffee maker as set forth in claim 1 wherein the lower portion of said stem is provided with a plurality of circumferentially spaced apertures facing the sidewall of said sump.

References Cited in the file of this patent
UNITED STATES PATENTS

| | | |
|---|---|---|
| 994,398 | Holley | June 6, 1911 |
| 1,007,725 | Nelson | Nov. 7, 1911 |
| 1,719,473 | Hron | July 2, 1929 |
| 2,704,506 | Kircher | Mar. 22, 1955 |
| 2,726,607 | Kircher | Dec. 13, 1955 |